E. E. BURNHAM.
COFFEE ROASTER.
APPLICATION FILED SEPT. 14, 1908.
920,428.
Patented May 4, 1909.
2 SHEETS—SHEET 1.
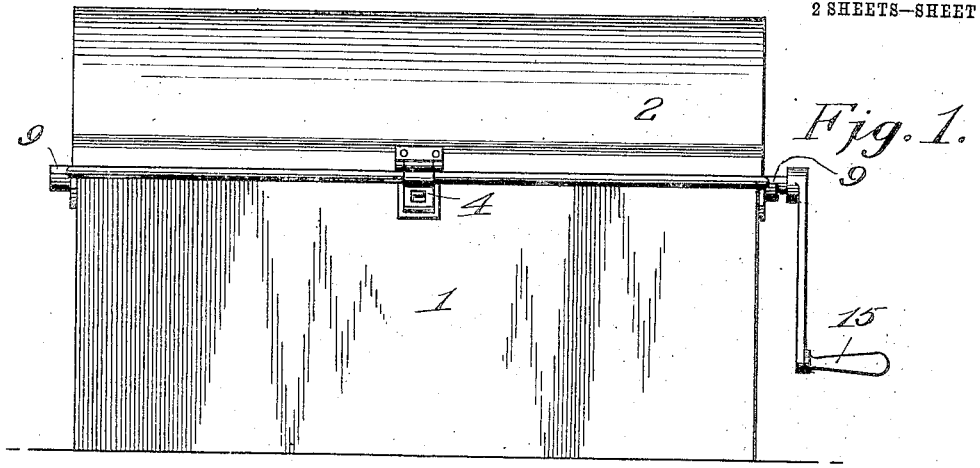
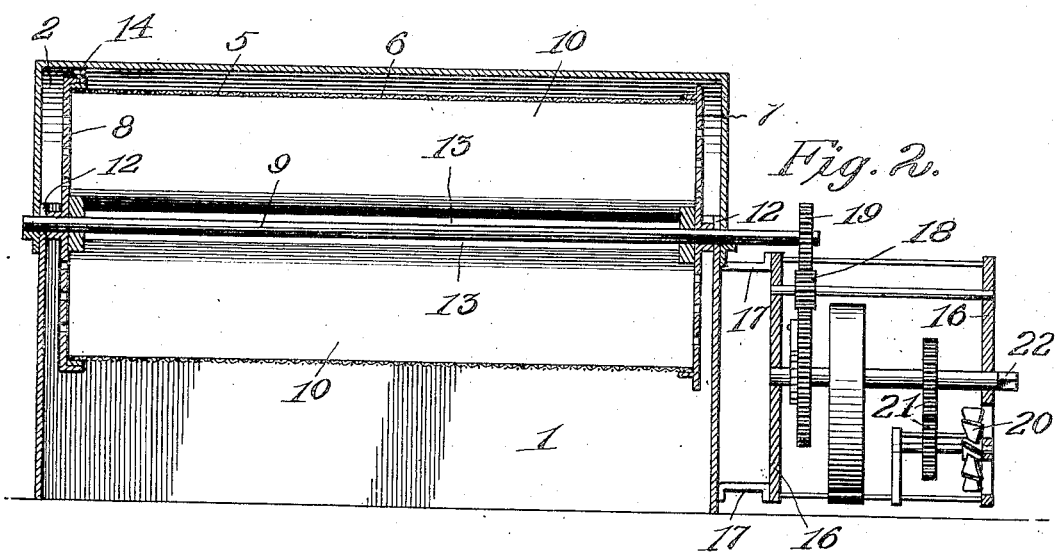
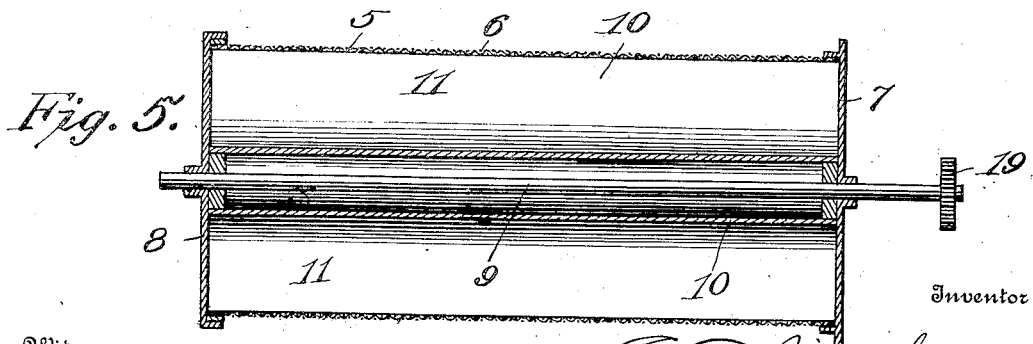
Witnesses
James F. Crown
M. L. Skinner
Inventor
E. E. Burnham
By Franklin H. Hough
Attorney

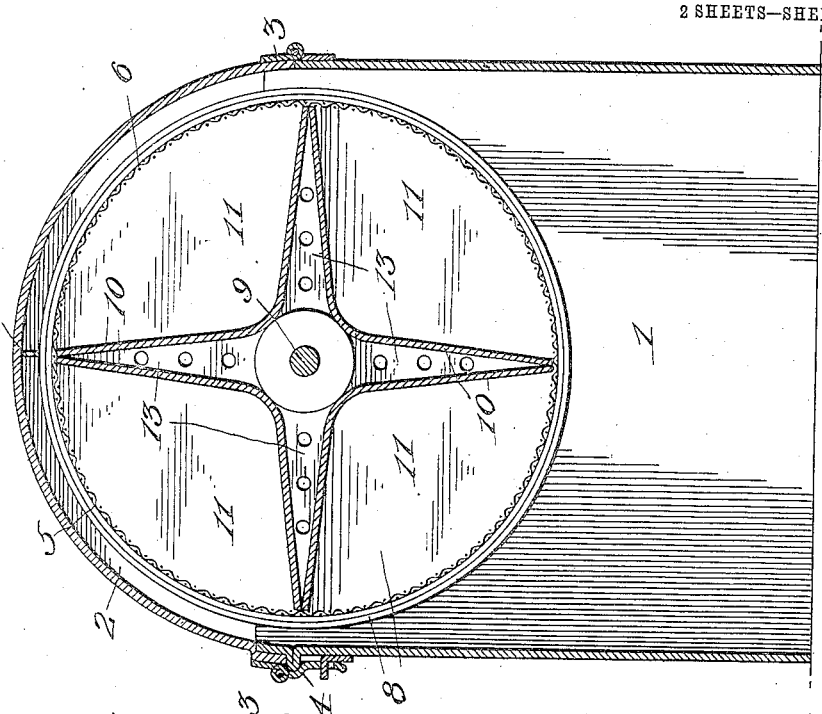
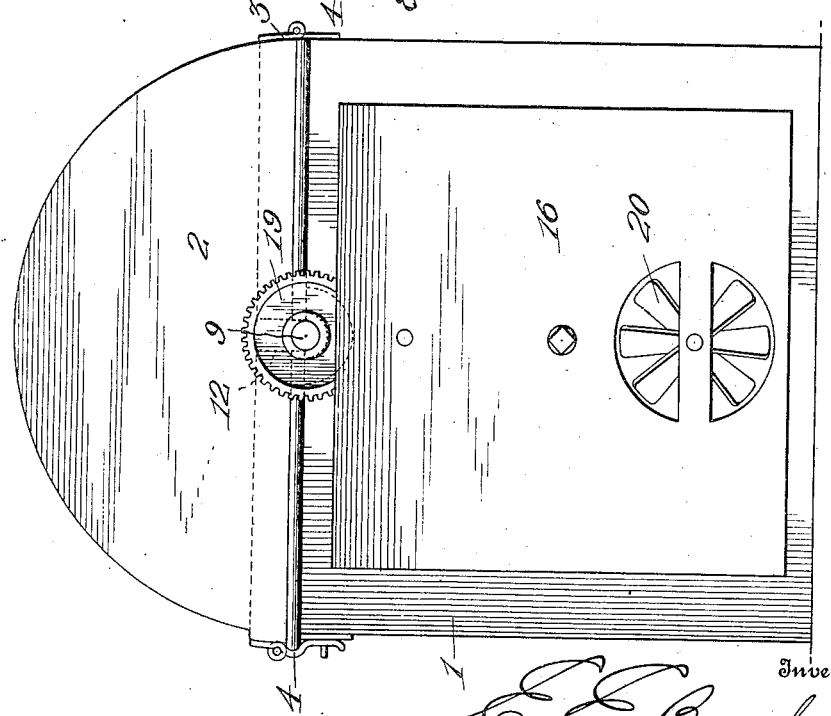

UNITED STATES PATENT OFFICE.

EDSON E. BURNHAM, OF AMITE, LOUISIANA.

COFFEE-ROASTER.

No. 920,428.　　　　Specification of Letters Patent.　　　　Patented May 4, 1909.

Application filed September 14, 1908. Serial No. 452,886.

*To all whom it may concern:*

Be it known that I, EDSON E. BURNHAM, a citizen of the United States, residing at Amite, in the parish of Tangipahoa and State of Louisiana, have invented certain new and useful Improvements in Coffee-Roasters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in machines for roasting coffee, popping corn, drying granular material, etc.

One object of the invention is to provide a simple and practical machine of this character which may be placed upon a stove and operated either manually or by a spring motor, and which will quickly and effectively roast coffee or perform analogous work.

Another object of the invention is to provide a machine of this character with an improved revolving drum for the coffee or granular material to be acted upon by the heat, the drum being so constructed that it will have a large capacity and be balanced to require little power to operate it and being also so constructed that the coffee will be continuously rolled from the center in an outward direction and exposed at all points to an even heat.

A further object of the invention is to provide an improved spring motor for operating the roasting drum.

With the above and other objects in view, the invention consists of the novel features of construction and the combination and arrangement of parts hereinafter fully described and claimed, and illustrated in the accompanying drawings, in which—

Figure 1 is a front elevation of the machine showing it provided with a crank handle; Fig. 2 is a vertical longitudinal section showing a spring motor connected to it for operating its rotary drum; Fig. 3 is an end elevation of the machine shown in Fig. 2 looking toward the motor; Fig. 4 is a vertical transverse section; and Fig. 5 is a longitudinal section through the drum.

My invention comprises a body 1 of rectangular or other shape having a flared lower portion without a bottom to rest upon a stove or other heater. The top of the body 1 is also open but is adapted to be closed by a substantially semi-cylindrical cover 2 hinged upon one side, as at 3, and provided upon its other side with a fastener 4. The cover 2 is adapted to confine the heat within the body and around a revoluble drum 5 which is removably mounted and which may be rotated either manually or automatically by a motor.

The drum 5 is of peculiar construction consisting of a cylindrical body portion 6 of woven wire fabric or other reticulate material, a fixed end or head 7, a removable end or head 8, a central longitudinal shaft 9, and a plurality of curved or angular partition plates 10 which divide the interior of the drum into a plurality of longitudinal compartments 11. The shaft 9 is arranged for rotation in vertical bearing slots or recesses 12 formed centrally in the ends of the body 1 at their upper edges and owing to this construction the drum may be readily removed from the body or replaced therein when the cover 2 is open. I preferably provide four of the partition plates 10 in the drum, as clearly shown in Fig. 4, and they are arranged so as to provide air spaces 13 between them and hence between the compartments 11 formed by them. By arranging said partitions as shown, it will be seen that heated air may reach every part of the walls of each of the apartments so that the coffee or other material within them will be evenly heated. Said partitions also permit the drum to effectively operate upon a large quantity of coffee since the total quantity is divided into sections and each section or portion is effectively treated in the several compartments. These compartments formed by the partitions cause the coffee to roll continuously from the center to the outside of the drum and back again, thereby causing it to be evenly heated and roasted, and said compartments furthermore cause the coffee to balance the drum and require very little power to rotate it. When the drum is removed from the body 1 its head 8 may be removed to permit roasted coffee to be removed from the compartments 11 and replaced by green coffee which is to be roasted. The head or cover 8 has a surrounding flange and is preferably secured in position by means of one or more set screws 14 arranged in said flange.

The shaft 9 of the drum may have one of its ends extended and carrying a crank handle 15 (as shown in Fig. 1) by means of which it may be manually rotated; but I preferably employ a spring motor for this purpose. This motor is in the form of an attachment which may be bolted or otherwise secured to one end of the body 1 and as illustrated it comprises a frame or casing 16 secured to and spaced from the end of the body 1 by brackets 17.

The motor may be of any suitable form and construction and has a gear 18 so arranged that when the drum is in position in the body a gear 19 fixed to its shaft 9 will mesh with the gear 18. In order to prevent the works of the motor from being affected by the heat of the stove I preferably provide in its frame 16 a fan 20 which is geared to one of the shafts of the motor, as shown at 21, and which is adapted to create a blast of air within the frame 16 so as to cool the spring and other portions of the motor.

22 denotes the winding shaft of the motor to which may be applied a winding crank handle.

From the foregoing it will be seen that my invention provides an exceedingly simple and practical machine by means of which coffee may be quickly and effectively roasted, pop corn may be popped, granular material may be dried, etc. The peculiar construction of the drum causes the material within it to be quickly, thoroughly, and evenly heated, and so counterbalances it that very little power will be required to rotate it.

Having thus described my invention what I claim is:

1. A machine of the character described comprising a casing, a horizontal shaft therein, a drum of reticulate material upon the shaft and partitions in said drum dividing it into separate compartments and spaced apart to provide air spaces between them.

2. A machine of the character described comprising a casing having an open bottom to rest upon a stove, a cover for the top of the casing, a drum of reticulate material, a shaft for said drum removably arranged in bearings in the casing, partitions in said drum dividing it into longitudinal compartments, said partitions being spaced apart to provide air spaces between them and means for rotating said shaft.

3. A machine of the character described comprising a casing having an open bottom to rest upon a stove, a cover for the top of the casing, a drum of reticulate material, a shaft for said drum removably arranged in bearings in the casing, partitions in said drum dividing it into longitudinal compartments, said partitions being spaced apart to provide air spaces between them, a removable head at one end of said drum, means for securing said removable head upon the drum and means for rotating said shaft.

4. A machine of the character described comprising a casing having an open bottom to rest upon a stove, a cover for the top of the casing, a drum of reticulate material, a shaft for said drum removably arranged in bearings in the casing, partitions in said drum dividing it into longitudinal compartments, said partitions being spaced apart to provide air spaces between them, a spring motor having a driving gear and a gear upon one end of said shaft to mesh with the gear of the motor when said shaft is arranged in the bearings in the casing.

5. A machine of the character described comprising a casing having an open bottom to rest upon a stove, a cover for the top of the casing, a drum of reticulate material, a shaft for said drum removably arranged in bearings in the casing, partitions in said drum dividing it into longitudinal compartments, said partitions being spaced apart to provide air spaces between them, a gear upon the drum shaft, a spring motor having its frame or body arranged upon one end of the casing and provided with a driving gear to mesh with the gear on the drum shaft when the latter is engaged with its bearings in the casing, and a fan driven by said motor for cooling the works of the latter.

In testimony whereof I hereunto affix my signature in the presence of two witnesses.

EDSON E. BURNHAM.

Witnesses:
  HYPOLITE MIXON,
  R. H. SCARLE.